United States Patent
Duimovich et al.

(10) Patent No.: US 10,061,701 B2
(45) Date of Patent: Aug. 28, 2018

(54) SHARING OF CLASS DATA AMONG VIRTUAL MACHINE APPLICATIONS RUNNING ON GUESTS IN VIRTUALIZED ENVIRONMENT USING MEMORY MANAGEMENT FACILITY

(75) Inventors: Gianni S. Duimovich, Ottawa (CA); Prasanna K. Kalle, Bangalore (IN); Angela Lin, Dublin (IE); Andrew R. Low, Stittsville (CA); Prashanth K. Nageshappa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 2253 days.

(21) Appl. No.: 12/767,413

(22) Filed: Apr. 26, 2010

(65) Prior Publication Data

US 2011/0264841 A1    Oct. 27, 2011

(51) Int. Cl.
*G06F 12/00*   (2006.01)
*G06F 12/084*  (2016.01)
(Continued)

(52) U.S. Cl.
CPC ........ *G06F 12/084* (2013.01); *G06F 9/44521* (2013.01); *G06F 9/45558* (2013.01); *G06F 2009/45583* (2013.01)

(58) Field of Classification Search
CPC ............... G06F 12/084; G06F 9/44521; G06F 9/45558; G06F 2009/45583
See application file for complete search history.

(56) References Cited

U.S. PATENT DOCUMENTS 5,457,793 A * 10/1995 Elko et al. .................... 711/100
5,493,668 A *  2/1996 Elko et al. .................... 711/130
(Continued)

FOREIGN PATENT DOCUMENTS

WO         00/52572 A1    9/2000
WO      2005/114407 A2   12/2005

OTHER PUBLICATIONS

Corrie, Ben, Java Technology, IBM Style: Class Sharing, dated May 30, 2006, http://www.ibm.com/developerworks/java/library/j-ibmjava4/.
(Continued)

*Primary Examiner* — Nanci N Wong
(74) *Attorney, Agent, or Firm* — Robert A. Voigt, Jr.; Winstead, P.C.

(57) ABSTRACT

A method, system and computer program product for sharing class data among virtual machine applications running on one or more guests in a virtualized environment. A control program in a virtual operating system is used to manage the user portions of the virtual operating system, each commonly referred to as a guest. A guest operating system runs on each guest and applications can run on each guest operating system. A memory management facility manages shared memory which includes a class cache configured to store class data. The shared memory may be mounted onto each guest using a cluster file system or accessed via an API interface thereby allowing the class cache to be shared across the guests. By sharing the class cache among the guests, multiple copies of the same class data are no longer necessary thereby optimally using the physical memory on the host.

20 Claims, 5 Drawing Sheets

(51) Int. Cl.
*G06F 9/445* (2018.01)
*G06F 9/455* (2018.01)

(56) References Cited

U.S. PATENT DOCUMENTS

| | | | |
|---|---|---|---|
| 6,430,564 B1* | 8/2002 | Judge et al. | |
| 6,519,594 B1 | 2/2003 | Li | |
| 6,738,977 B1* | 5/2004 | Berry | G06F 9/44563 718/1 |
| 6,961,941 B1* | 11/2005 | Nelson et al. | 719/319 |
| 7,003,768 B2 | 2/2006 | Daynes et al. | |
| 7,412,702 B1* | 8/2008 | Nelson et al. | 718/1 |
| 7,490,324 B2 | 2/2009 | Shultz et al. | |
| 7,620,791 B1* | 11/2009 | Wentzlaff et al. | 711/202 |
| 2002/0133675 A1* | 9/2002 | Hirayama | G06F 3/0619 711/150 |
| 2003/0208505 A1* | 11/2003 | Mullins et al. | 707/102 |
| 2004/0064570 A1* | 4/2004 | Tock | 709/228 |
| 2005/0081019 A1* | 4/2005 | DeWitt, Jr. | G06F 9/30181 712/227 |
| 2005/0262181 A1* | 11/2005 | Schmidt et al. | 709/200 |
| 2006/0184741 A1* | 8/2006 | Hrusecky et al. | 711/130 |
| 2006/0212468 A1* | 9/2006 | Harscoet | G06F 9/445 |
| 2007/0106716 A1* | 5/2007 | Corrie | 707/206 |
| 2007/0245331 A1 | 10/2007 | Daynes et al. | |
| 2008/0022049 A1* | 1/2008 | Hughes et al. | 711/130 |
| 2008/0086725 A1 | 4/2008 | Boss et al. | |
| 2008/0127221 A1 | 5/2008 | Otte et al. | |
| 2009/0055601 A1 | 2/2009 | McKenney et al. | |
| 2009/0125611 A1 | 5/2009 | Barsness et al. | |
| 2009/0241192 A1 | 9/2009 | Thomas | |
| 2011/0154488 A1* | 6/2011 | Rajan | H04L 63/123 726/22 |

OTHER PUBLICATIONS

How to Use Execute-in-Place Technology with Linux on z/VM, Dec. 14, 2005.

Waldspurger, Carl A., Memory Resource Management in VMware ESX Server, in Proc. Fifth Symposium on Operating Systems Design and Implementation (OSDI '02), Dec. 2002.

Senthilvelan, Selvamuthukumar et al., Study of Content-Based Sharing on the Xen Virtual Machine Monitor, University of Wisconsin, Madison.

Linux on IBM System z with z/VM V6, Oct. 2009, http://www.vm.ibm.com/library/zlinux61.pdf.

Enterprise Linux Server, IBM z/VM Virtualisation, 2009, http://www-03.ibm.com/systems/resources/systems_uk_els_z_vm_virtualisation.pdf.

\* cited by examiner

SHARING OF CLASS DATA AMONG VIRTUAL MACHINE APPLICATIONS RUNNING ON GUESTS IN VIRTUALIZED ENVIRONMENT USING MEMORY MANAGEMENT FACILITY

TECHNICAL FIELD

The present invention relates to virtualized computers, and more particularly to sharing class data among virtual machine applications running on guests in a virtualized environment using a memory management facility.

BACKGROUND OF THE INVENTION

In a virtualized computer, the computer includes a virtual operating system. The virtual operating system includes a common base portion and separate user portions that all run on a physical computer. The physical computer is referred to as a host. The common base portion may be referred to as a hypervisor or control program and each user portion may be called a guest. Each guest is a logical partition of physical resources of the computer. A guest operating system runs on each guest, and the guest appears to the guest operating system as a real computer. One or more applications can run on each guest operating system and its guest.

As discussed above, on each guest operating system, one or more applications (e.g., Java™ virtual machines) can be run. However, the applications (e.g., Java™ virtual machines) executing on each of these guest operating systems are not able to share class data (e.g., Java™ class data) even though they could be using the same classes. That is, the class data is required to be loaded into each guest's allocation of the host physical memory even though the class data may be common across the applications. As a result of not being able to share the class data among the guests, multiple copies of the same class data may reside in the host memory thereby not optimally using the physical memory on the host.

BRIEF SUMMARY OF THE INVENTION

In one embodiment of the present invention, a method for sharing class data among virtual machine applications running on one or more guests in a virtualized environment comprises determining if class data to be loaded by a virtual machine application in a first of a plurality of guests resides in a class cache. The class cache is shared across the plurality of guests. The method further comprises loading the class data from a disk if the class data does not reside in the class cache. Additionally, the method comprises writing the loaded class data in the class cache.

In another embodiment of the present invention, a method for sharing class data among virtual machine applications running on one or more guests in a virtualized environment comprises designating a range of shared memory in physical memory to be shared across a plurality of guests. The method further comprises enabling the shared memory to be accessible to each of the plurality of guests using either a cluster file system or an application programming interface. Additionally, the method comprises mapping the shared memory into an address space for each virtual machine application running on the plurality of guests. In addition, the method comprises accessing contents of the shared memory via direct addressing.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for sharing class data among the virtual machine applications running on one or more guests in a virtualized environment. In one embodiment of the present invention, a hypervisor or control program in a virtual operating system is used to manage the user portions of the virtual operating system, each commonly referred to as a guest. Each guest is a logical partition of the physical resources of the computer. A guest operating system runs on each guest and one or more applications (e.g., Java™ virtual machines) can run on each guest operating system. A memory management facility, such as a cross guest shared memory or a discontiguous saved segments (DCSS), designates one or more ranges of physical memory to be shared across guests. The shared memory is made readable and writable to applications on each guest via methods such as, direct memory mapping, an application programming interface or mounting via a virtual cluster file system. A class cache is placed in the shared memory thereby allowing the class cache, and the class data stored in it, to be shared across the guests. By sharing the class cache among the guests, multiple copies of the same class data are no longer necessary thereby optimally using the physical memory on the host.

While the following discusses the present invention in connection with sharing class data, the principles of the present invention may be applied to shared ahead-of-time (AOT) compiled code of methods. Sharing of such AOT code further enhances the benefits of sharing, as discussed herein, as virtual machine applications (e.g., Java™ virtual machines) from different guests can use the compiled code directly instead of compiling the methods themselves. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
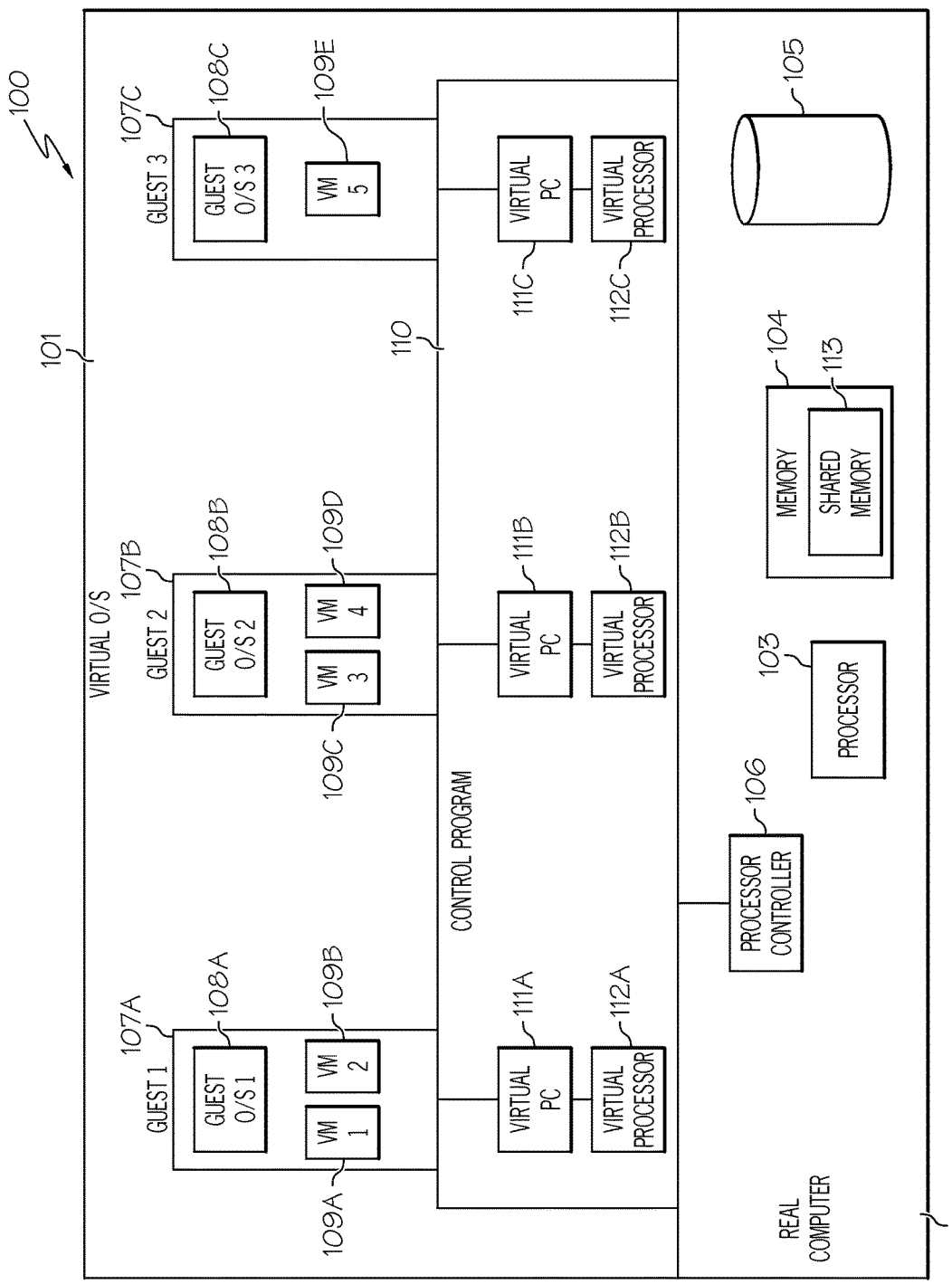
FIG. 1 is a configuration of a computer system configured in accordance with an embodiment of the present invention.

Referring now to the Figures in detail, FIG. 1 illustrates an embodiment of a configuration of a computer system 100 which is representative of an environment for practicing the present invention. Referring to FIG. 1, computer system 100 includes a virtual operating system 101, which can be an IBM™ z/VM operating system. Operating system 101 executes on a real or physical computer 102. Real computer 102 includes one or more processors 103, a memory 104 (also referred to herein as the host physical memory), one or more disk drives 105 and the like. Real computer 102 further includes a processor controller 106 that provides communication between virtual operating system 101 and physical computer 102. Other components of real computer 102 are not discussed herein for the sake of brevity.

Referring again to FIG. 1, virtual operating system 101 includes user portions 107A-C, referred to herein as "guests." Guests 107A-C may collectively or individually be referred to as guests 107 or guest 107, respectively. Each guest 107 is capable of functioning as a separate system. That is, each guest 107A-C can be independently reset, host a guest operating system 108A-C, respectively, and operate with different programs. An operating system or application program running in guest 107 appears to have access to a full and complete system, but in reality, only a portion of it is available. Guest operating systems 108A-C may collectively or individually be referred to as guest operating systems 108 or guest operating system 108, respectively.

Each guest operating system 108 may host one or more virtual machine applications 109A-E, such as Java™ virtual machines. For example, guest operating system 108A hosts virtual machine applications 109A-B. Guest operating system 108B hosts virtual machine applications 109C-D and guest operating system 108C host virtual machine application 109E. Virtual machine applications 109A-E may collectively or individually be referred to as virtual machine applications 109 or virtual machine application 109, respectively.

FIG. 1 is not to be limited in scope to a particular number of guests 107 executing a particular number of guest operating systems 108 hosting a particular number of virtual machine applications 109.

Virtual operating system 101 further includes a common base portion 110 referred to as a hypervisor or as a control program. Hypervisor or control program 110 may be implemented in microcode running on processor 103 or it may be implemented in software as part of virtual operating system 101. Control program 110 is configured to manage and enable guests 107 to run on a single host. Control program 110 includes a virtual processor controller 111A-C associated with each guest 107A-C, respectively. Virtual processor controllers 111A-C may collectively or individually be referred to as virtual processor controllers 111 or virtual processor controller 111, respectively. Virtual processor controller 111 provides communication between guest operating system 108 and control program 110.

Control program 110 further implements virtual processors 112A-C, one for each virtual processor controller 111A-C, respectively. That is, control program 110 implements virtual processors 112A-C, one for each guest 107A-C, respectively. Virtual processors 112A-C may collectively or individually be referred to as virtual processor 112 or virtual processor 112, respectively.

Additionally, FIG. 1 illustrates a memory 113 within host memory 104 to be shared among guests 107 as discussed in further detail with reference to FIG. 2.

As discussed above, virtual operating system 101 and its components execute on physical or real computer 102. These software components may be loaded into memory 104 for execution by processor 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As discussed in the Background section, the applications (e.g., Java™ virtual machines) executing on each of the guest operating systems are not able to share class data (e.g., Java™ class data) even though they could be using the same classes. As a result of not being able to share the class data among the guests, multiple copies of the class data may reside in the host memory, such as memory 104, thereby not optimally using the physical memory on the host.

Figure 3:
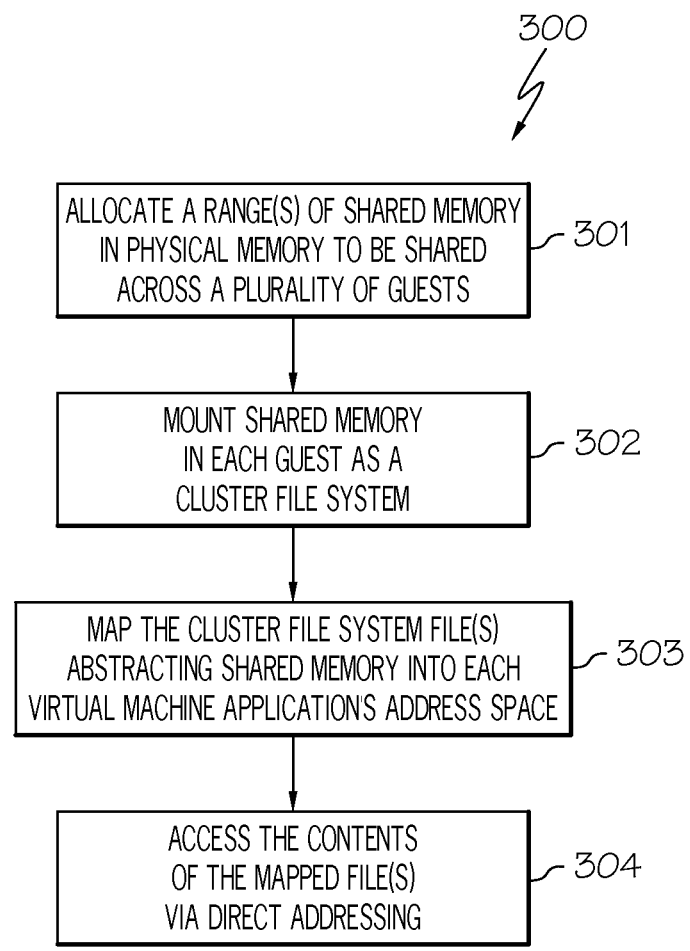
FIG. 3 is a flowchart of a method for accessing a shared memory via a cluster file system in accordance with an embodiment of the present invention.
Figure 4:
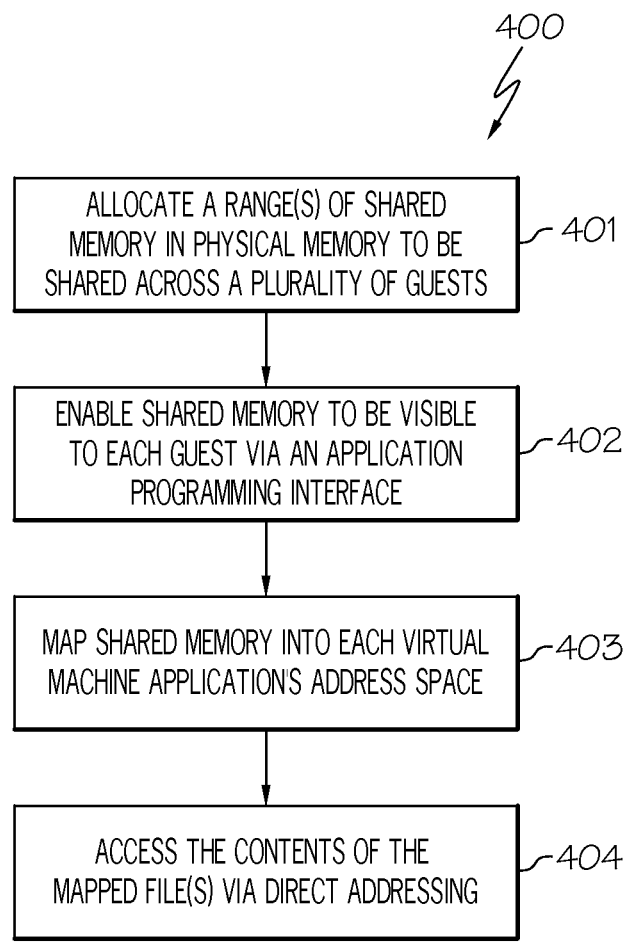
FIG. 4 is a flowchart of a method for accessing the shared memory via an application programming interface in accordance with an embodiment of the present invention.
Figure 5:
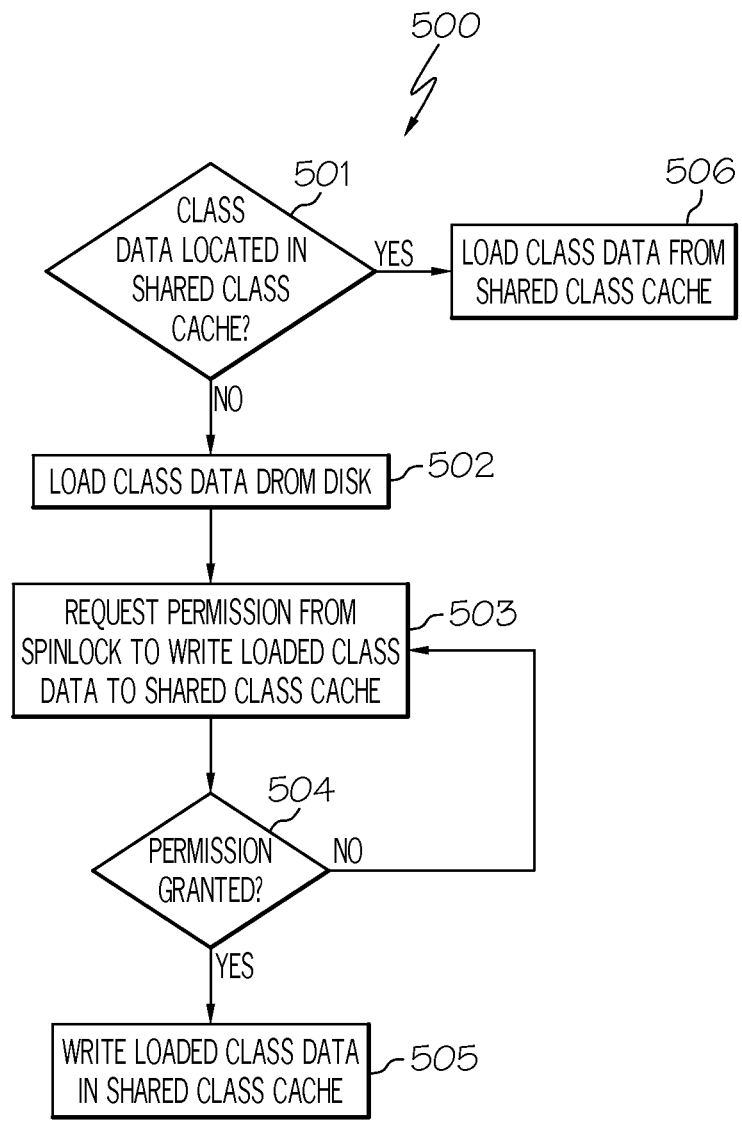
FIG. 5 is a flowchart of a method for sharing class data among the virtual machine applications running on guests in accordance with an embodiment of the present invention.

The principles of the present invention provide a technique for sharing class data among virtual machine applications running on one or more guests in a virtualized environment as discussed below in connection with FIGS. 2-5. FIG. 2 illustrates a memory management facility, which designates some memory that is shared across guests, which includes a class cache, so that the class cache storing class data is shared among the guests. FIG. 3 is a flowchart of a method for accessing the shared memory via a cluster file system. FIG. 4 is a flowchart of a method for accessing the shared memory via an application programming interface. FIG. 5 is a flowchart of a method for sharing class data among the virtual machine applications running on one or more guests in a virtualized environment.

Figure 2:
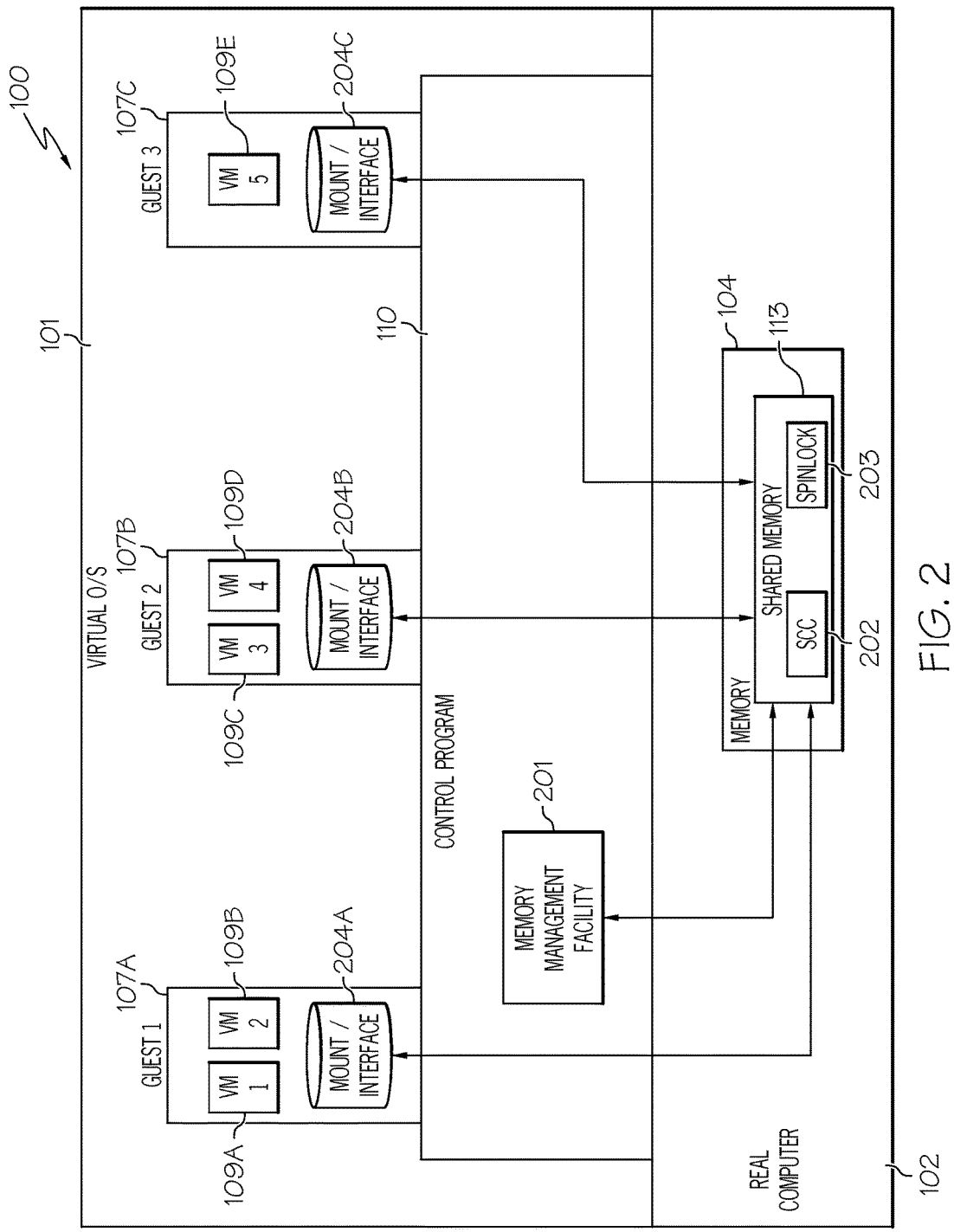
FIG. 2 illustrates the components of the computer system used for sharing class data among the virtual machine applications running on guests in accordance with an embodiment of the present invention.

Referring to FIG. 2, FIG. 2 illustrates the components of computer system 100 (FIG. 1) used for sharing class data among the virtual machine applications running on guests in accordance with an embodiment of the present invention.

As illustrated in FIG. 2, control program 110 includes a memory management facility 201, such as cross guest shared memory or discontiguous saved segments (DCSS). Memory management facility 201 is configured to share portions of memory among guests 107 as discussed below. Memory management facility 201 designates shared memory 113, which includes a shared class cache designated as "SCC" 202, which is used for storing class data, to be shared among guests 107. Furthermore, shared memory 113 includes a spinlock 203 used as a synchronization mechanism for ensuring that shared class cache 202 is not being written simultaneously. In one embodiment, write access to shared class cache 202 is managed by spinlock 203 constructed out of a portion of shared memory 113. Such a spinlock may be required as traditional locks (e.g., critical sections, semaphores, file locking) do not work across guests 107. A further description of shared class cache 202 and spinlock 203 is discussed below in connection with FIGS. 3-5.

Referring again to FIG. 2, in one embodiment, shared memory 113 is mounted onto guests 107 using a cluster file system as illustrated in disks 204A-C labeled "mount." Disks 204A-C may collectively or individually be referred to as disks 204 or disk 204, respectively. By mounting shared memory 113 onto guests 107 using a cluster file system, shared memory 113, including shared class cache 202, is setup for concurrent access across guests 107. By mounting shared memory 113 onto guests 107 using a cluster file system, class cache 202 is ensured to be consistent and is able to be accessed at memory speeds.

Alternatively, shared memory 113 is accessed by each guest 107 via direct memory mapping or via another application programming interface as illustrated in disks 204 labeled "interface." In this manner, shared memory 113, including shared class cache 202, is setup for concurrent access across guests 107.

A method for accessing shared memory 113 via a cluster file system is discussed below in connection with FIG. 3.

FIG. 3 is a flowchart of a method 300 for accessing shared memory 113 (FIGS. 1 and 2) via a cluster file system in accordance with an embodiment of the present invention.

Referring to FIG. 3, in conjunction with FIGS. 1 and 2, in step 301, memory management facility 201 (e.g., DCSS) allocates a range or ranges of shared memory 113 in physical memory 104. Each guest 107 is already allocated a range of memory in physical memory 104 and it is important for shared memory 113 to not overlap with these memory ranges.

In step 302, shared memory 113 is mounted in each guest 107 as a cluster file system. Memory management facility 201 provides access to shared memory 113 as an abstract peripheral device. As a result, a device driver may be required to interact with shared memory 113. The device driver is used by the cluster file system. As discussed above, the mounting of memory management facility 201 in each guest 107 is illustrated as disks 204 in FIG. 2.

In step 303, each virtual machine application 109 maps the cluster file system file(s) abstracting shared memory 113 into its own address space.

In step 304, each virtual machine application 109 accesses the contents of the mapped file(s) (i.e., the contents of shared memory 113) via direct addressing.

Thus, shared memory 113, including shared cache 202 and spinlock 203, can be accessed from virtual machine applications 109 running on one or more guests 107, as discussed in further detail below in connection with FIG. 5. Using a cluster file system, as opposed to a different type of file system, ensures consistency of concurrent accesses to shared memory 113 from different guests 107.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

A method for accessing shared memory 113 via an application programming interface is discussed below in connection with FIG. 4.

FIG. 4 is a flowchart of a method 400 for accessing shared memory 113 (FIGS. 1 and 2) via an application programming interface in accordance with an embodiment of the present invention.

Referring to FIG. 4, in conjunction with FIGS. 1 and 2, in step 401, memory management facility 201 (e.g., DCSS) allocates a range or ranges of shared memory 113 in physical memory 104. Each guest 107 is already allocated a range of memory in physical memory 104 and it is important for shared memory 113 to not overlap with these memory ranges.

In step 402, shared memory 113 is made visible to each guest 107 via an application programming interface.

In step 403, each virtual machine application 109 maps shared memory 113 into its own address space.

In step 404, each virtual machine application 109 accesses the contents of the mapped file(s) (i.e., the contents of shared memory 113) via direct addressing.

Thus, shared memory 113, including shared cache 202 and spinlock 203, can be accessed from virtual machine applications 109 running on one or more guests 107, as discussed in further detail below in connection with FIG. 5. By using the method of 400, consistency of concurrent accesses to shared memory 113 from different guests 107 is ensured.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

A method for sharing class data among virtual machine applications 109 running on guests 107 in a virtualized environment using memory management facility 201 is provided below in connection with FIG. 5.

Referring to FIG. 5, in conjunction with FIGS. 1-2, in step 501, virtual machine application 109 (e.g., Java™ virtual machine) determines if class data to be loaded resides in shared class cache 202.

If the class data is not located in shared class cache 202, then, in step 502, the class data is loaded from a disk, such as disk 105 (FIG. 1) of real computer 102.

In step 503, virtual machine application 109 requests permission from spinlock 203 to write the loaded class data to shared class cache 202. Spinlock 203 is a lock where the thread simply waits in a loop ("spins") repeatedly checking until the lock becomes available. That is, virtual machine application 109 repeatedly checks with spinlock 203 to find out if shared class cache 202 is accessible to write the loaded class. Spinlock 203 is used as a synchronization mechanism to ensure that shared class cache 202 is not being written simultaneously by other virtual machine applications 109.

In step 504, virtual machine application 109 determines whether permission is granted to write the loaded class data to shared class cache 202. If permission is not granted, then, in step 403, virtual machine application 109 checks again with spinlock 203 to find out if shared class cache 202 is accessible to write the loaded class data.

If permission is granted, then, in step 505, virtual machine application 109 writes the loaded class data in shared class cache 202. As a result, when another virtual machine application 109 from another guest 107 attempts to load this class data, this class data will already be present in the shared class cache 202.

Returning to step 501, if, however, the class data is located in shared class cache 202, then, in step 506, the class data is read from shared class cache 202. As a result of having the class data already loaded in shared class cache 202, the need for an additional copy of the class data is negated. That is, multiple copies of the same class data are no longer necessary thereby optimally using the physical memory on the host.

Method 500 may include other and/or additional steps that, for clarity, are not depicted. Further, method 500 may be executed in a different order presented and that the order presented in the discussion of FIG. 5 is illustrative. Additionally, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for sharing class data among virtual machine applications running on one or more guests in a virtualized environment, the method comprising:

determining if class data to be loaded by a virtual machine application in a first of a plurality of guests resides in a class cache, wherein said class cache is shared across said plurality of guests, wherein said class cache is located within a shared memory to be shared among said plurality of guests, wherein said shared memory is located within a host;

loading said class data from a disk in response to said class data not residing in said class cache;

requesting permission, by said virtual machine application, from a spinlock to write said loaded class data in said class cache in response to said class data not residing in said class cache, wherein said spinlock is a lock where a thread waits in a loop repeatedly checking until said lock becomes available, wherein said spinlock is included within said shared memory, wherein said spinlock is a synchronization mechanism to ensure said class cache is not being written simultaneously by other virtual machine applications;

determining, by said virtual machine application, whether permission is granted to write said loaded class data in said class cache; requesting permission, by said virtual machine application, a subsequent time from said spinlock to write said loaded class data in said class cache in response to not receiving permission to write said loaded class data in said class cache; and writing, by said virtual machine application, said loaded class data in said class cache in response to permission being granted to write said loaded class data in said class cache so that said host only stores a single copy of said class data.

2. The method as recited in claim 1, wherein said shared memory is mounted in each of said plurality of guests as a cluster file system, wherein the method further comprises:
mapping said cluster file system files abstracting said shared memory into an address space of said virtual machine application.

3. The method as recited in claim 2 further comprising:
accessing contents of said mapped files via direct accessing.

4. The method as recited in claim 1 further comprising:
reading said class data from said class cache in response to said class data residing in said class cache.

5. The method as recited in claim 1, wherein said class cache is shared across said plurality of guests via one of a cluster file system and an application programming interface.

6. The method as recited in claim 1 further comprising:
mapping said shared memory into an address space of said virtual machine application, wherein said shared memory is accessible via an application programming interface.

7. The method as recited in claim 1, wherein said class cache is shared across said plurality of guests via a cluster file system.

8. A computer program product embodied in a non-transitory computer readable storage medium for sharing class data among virtual machine applications running on one or more guests in a virtualized environment, the computer program product comprising:
a plurality of guests, wherein each of said plurality of guests is a logical partition of physical resources of a host computer, wherein each of said plurality of guests executes a guest operating system which hosts one or more virtual machine applications; and
a control program configured to manage said plurality of guests, wherein said control program comprises a memory management facility configured to share portions of memory among said plurality of guests, wherein said shared memory comprises a class cache, wherein said shared memory is located within said host, wherein said class cache is shared across said plurality of guests;
wherein one of said one or more virtual machine applications in a first of said plurality of guests comprises the programming instructions for:
determining if class data to be loaded by a virtual machine application in a first of a plurality of guests resides in said class cache;
loading said class data from a disk in response to said class data not residing in said class cache;
requesting permission from a spinlock to write said loaded class data in said class cache in response to said class data not residing in said class cache, wherein said spinlock is a lock where a thread waits in a loop repeatedly checking until said lock becomes available, wherein said spinlock is included within said shared memory, wherein said spinlock is a synchronization mechanism to ensure said class cache is not being written simultaneously by other virtual machine applications;
determining whether permission is granted to write said loaded class data in said class cache;
requesting permission a subsequent time from said spinlock to write said loaded class data in said class cache in response to not receiving permission to write said loaded class data in said class cache; and
writing said loaded class data in said class cache in response to permission being granted to write said loaded class data in said class cache so that said host only stores a single copy of said class data.

9. The computer program product as recited in claim 8, wherein said shared memory is mounted in each of said plurality of guests as a cluster file system, wherein said one of said one or more virtual machine applications in said first of said plurality of guests further comprises the programming instructions for:
mapping said cluster file system files abstracting said shared memory into an address space of said virtual machine application.

10. The computer program product as recited in claim 9, wherein said one of said one or more virtual machine applications in said first of said plurality of guests further comprises the programming instructions for:
accessing contents of said mapped files via direct accessing.

11. The computer program product as recited in claim 8, wherein said one of said one or more virtual machine applications in said first of said plurality of guests further comprises the programming instructions for:
reading said class data from said class cache in response to said class residing in said class cache.

12. The computer program product as recited in claim 8, wherein said class cache is shared across said plurality of guests via one of a cluster file system and an application programming interface.

13. The computer program product as recited in claim 8, wherein said one of said one or more virtual machine applications in said first of said plurality of guests further comprises the programming instructions for:
mapping said shared memory into an address space of said virtual machine application, wherein said shared memory is accessible via an application programming interface.

14. The computer program product as recited in claim 8, wherein said class cache is shared across said plurality of guests via a cluster file system.

15. A system, comprising:
a memory unit of a host computer for storing a computer program for sharing class data among virtual machine applications running on one or more guests in a virtualized environment; and
a processor of said host computer coupled to said memory unit, wherein the processor is configured to execute the program instructions of the computer program comprising:
allocating a virtual operating system comprising a plurality of guests, wherein each of said plurality of guests is a logical partition of physical resources of said system, wherein each of said plurality of guests executes a guest operating system which hosts one or more virtual machine applications; and
allocating a control program in said virtual operating system, wherein said control program is configured to manage said plurality of guests, wherein said control program comprises a memory management facility configured to share portions of memory among said plurality of guests, wherein said shared memory comprises a class cache, wherein said shared memory is located within said host, wherein said class cache is shared across said plurality of guests;
wherein one of said one or more virtual machine applications in a first of said plurality of guests comprises the programming instructions for:
  determining if class data to be loaded by a virtual machine application in a first of a plurality of guests resides in said class cache;
  loading said class data from a disk in response to said class data not residing in said class cache;
  requesting permission from a spinlock to write said loaded class data in said class cache in response to said class data not residing in said class cache, wherein said spinlock is a lock where a thread waits in a loop repeatedly checking until said lock becomes available, wherein said spinlock is included within said shared memory, wherein said spinlock is a synchronization mechanism to ensure said class cache is not being written simultaneously by other virtual machine applications;
  determining whether permission is granted to write said loaded class data in said class cache;
  requesting permission a subsequent time from said spinlock to write said loaded class data in said class cache in response to not receiving permission to write said loaded class data in said class cache; and
  writing said loaded class data in said class cache in response to permission being granted to write said loaded class data in said class cache so that said host only stores a single copy of said class data.

16. The system as recited in claim 15, wherein said shared memory is mounted in each of said plurality of guests as a cluster file system, wherein said one of said one or more virtual machine applications in said first of said plurality of guests further comprises the programming instructions for:
  mapping said cluster file system files abstracting said shared memory into an address space of said virtual machine application.

17. The system as recited in claim 16, wherein said one of said one or more virtual machine applications in said first of said plurality of guests further comprises the programming instructions for:
  accessing contents of said mapped files via direct accessing.

18. The system as recited in claim 15, wherein said one of said one or more virtual machine applications in said first of said plurality of guests further comprises the programming instructions for:
  reading said class data from said class cache in response to said class data residing in said class cache.

19. The system as recited in claim 15, wherein said class cache is shared across said plurality of guests via one of a cluster file system and an application programming interface.

20. The system as recited in claim 15, wherein said one of said one or more virtual machine applications in said first of said plurality of guests further comprises the programming instructions for:
  mapping said shared memory into an address space of said virtual machine application, wherein said shared memory is accessible via an application programming interface.

* * * * *